United States Patent [19]

Hayes

[11] Patent Number: 5,034,024

[45] Date of Patent: Jul. 23, 1991

[54] SURFACTANT TREATMENT OF AROMATIC POLYIMIDE GAS SEPARATION MEMBRANES

[75] Inventor: Richard A. Hayes, Parkersburg, W. Va.

[73] Assignee: E. I. Du Pont de Nemours and Company, Wilmington, Del.

[21] Appl. No.: 418,836

[22] Filed: Oct. 10, 1989

[51] Int. Cl.$^5$ .................... B01D 53/22; B01D 71/64
[52] U.S. Cl. .......................... 55/16; 55/68; 55/158
[58] Field of Search ................ 55/16, 68, 158

[56] References Cited

U.S. PATENT DOCUMENTS

| | | | |
|---|---|---|---|
| Re. 30,351 | 7/1980 | Hoehn et al. | 55/158 X |
| 3,325,330 | 6/1967 | Robb | 156/229 |
| 3,874,986 | 4/1975 | Browall et al. | 161/160 |
| 3,980,456 | 9/1976 | Browall | 55/158 |
| 4,080,743 | 3/1978 | Manos | 55/16 X |
| 4,080,744 | 3/1978 | Manos | 55/16 X |
| 4,120,098 | 10/1978 | Manos | 55/16 X |
| 4,230,463 | 10/1980 | Henis et al. | 55/68 X |
| 4,472,175 | 9/1984 | Malon et al. | 55/158 X |
| 4,484,935 | 11/1984 | Zampini | 55/158 |
| 4,486,202 | 12/1984 | Malon et al. | 55/158 |
| 4,486,376 | 12/1984 | Makino et al. | 264/342 R |
| 4,512,893 | 4/1985 | Makino et al. | 210/500.2 |
| 4,512,894 | 4/1985 | Wang | 210/500.2 |
| 4,527,999 | 7/1985 | Lee | 55/16 |
| 4,554,076 | 11/1985 | Speaker | 210/639 |
| 4,567,999 | 2/1986 | Hjertman et al. | 222/3 |
| 4,606,740 | 8/1986 | Kulprathipanja | 55/158 X |
| 4,654,055 | 3/1987 | Malon et al. | 55/158 |
| 4,705,540 | 11/1987 | Hayes | 55/158 X |
| 4,715,960 | 12/1987 | Thompson | 210/651 |
| 4,717,394 | 1/1988 | Hayes | 55/16 |
| 4,728,346 | 3/1988 | Murphy | 55/158 |
| 4,859,215 | 8/1989 | Langsam et al. | 55/158 X |
| 4,863,496 | 9/1989 | Ekiner et al. | 55/16 X |
| 4,871,461 | 10/1989 | Karakane et al. | 55/16 X |
| 4,877,421 | 10/1989 | Bikson et al. | 55/16 |
| 4,883,593 | 11/1989 | Friesen et al. | 55/158 X |

FOREIGN PATENT DOCUMENTS

| | | | |
|---|---|---|---|
| 0107636 | 9/1983 | European Pat. Off. | |
| 0179474 | 4/1986 | European Pat. Off. | 55/158 |
| 0219878 | 4/1987 | European Pat. Off. | 55/158 |
| 59-216603 | 12/1984 | Japan | 55/158 |
| 62-294419 | 12/1987 | Japan | 55/158 |
| 63-151333 | 6/1988 | Japan | 55/158 |
| 1-080419 | 3/1989 | Japan | 55/158 |
| 1-123617 | 5/1989 | Japan | 55/158 |
| 1-123618 | 5/1989 | Japan | 55/158 |

*Primary Examiner*—Robert Spitzer
*Attorney, Agent, or Firm*—Craig H. Evans

[57] ABSTRACT

A process for improving the permselectivity of an aromatic polyimide gas separation membrane comprising contacting the membrane with a solution of a surfactant in a solvent which swells the membrane but in which the membrane material is soluble to an extent of no more than 3% under the conditions used to contact the membrane.

15 Claims, No Drawings

SURFACTANT TREATMENT OF AROMATIC POLYIMIDE GAS SEPARATION MEMBRANES

FIELD OF THE INVENTION

The present invention relates to aromatic polyimide gas separation membranes and a treatment for such membranes to improve their permselectivity with respect to at least one pair of gases in a multicomponent gas mixture. The treatment involves applying a surfactant dissolved in a liquid non-solvent for the aromatic polyimide forming the permselective gas separation membrane. Said surfactant/liquid non-solvent mixture is capable of enhancing permselectivity to a greater degree than the liquid non-solvent alone.

PRIOR ART

U.S. Pat. No. 4,472,175 discloses asymmetric gas separation membranes which have been treated on one or both surfaces with a Bronsted-Lowry acid to improve the permselectivity of the membrane for at least one gas of a gaseous mixture.

U.S. Pat. No. 4,554,076 discloses a method for improving the separatory properties of membranes by depositing on the surface of such membrane a fluorinated amphiphilic compound in an oriented Langmuir-Blodgett layer to increase membrane selectivity. The patent is primarily directed to liquid-liquid separations, but gases are mentioned.

U.S. Pat. No. 4,654,055 discloses asymmetric gas separation membranes which have been treated on one or both surfaces with a Bronsted-Lowry base to improve the permeation selectivity of the membrane for at least ore gas of a gaseous mixture.

EPO - 0,179,474 discloses treating various polymeric gas separation membranes with a dilute solution of a cationic surfactant in a volatile non-polar organic solvent to improve the selectivity of the membrane with respect to separating two gases selected from the group consisting of $CO_2$, $CH_4$ and He.

SUMMARY OF THE INVENTION

Gas separation membranes desirably have a high permeability to gases. This means that the effective portion of the membrane should be as thin as possible. Making the membranes as thin as possible necessarily leads to the membrane containing imperfections or defects. These defects pass gases indiscriminately, which reduces the selectivity of the membrane with respect to one gas from a mixture of gases preferentially permeating the membrane. The present invention relates to a process for apparently healing these defects to provide an aromatic polyimide membrane having improved permselectivity with respect to at least one gas in a gaseous mixture by treatment with a dilute solution of a surfactant.

DETAILED DESCRIPTION

Most commercial aromatic polyimide gas separation membranes are asymmetric in nature. They are made by casting a film or extruding a hollow fiber from a solution of an aromatic polyimide or polyamic acid precursor in a solvent mixture, evaporating a portion of the solvent from one side of the film or the outside of the hollow fiber and quenching in a nonsolvent. In the case of a polyamic acid precursor it is then cyclized by a suitable treatment such as the application of heat. The resulting asymmetric membrane is characterized by a thin skin of polymer supported by a generally cellular structure. This provides a membrane having a thin effective separation member, which results in a high flux or permeation rate to gases, which is highly desirable. However, this effort to form a highly permeable membrane also leads to the formation of submicroscopic defects which pass gases indiscriminately causing the membrane to have an effective separation value for most pairs of gases which is less than the intrinsic separation value of the polymer from which the membrane is made.

The selectivity of one gas over another in a multicomponent mixture by permeation through a gas separations membrane is controlled, in part, by the molecular free volume in the dense separating layer of the membrane. To obtain the intrinsic gas selectivity of a membrane, a perfect, defect-free, dense separating layer must be formed during the membrane formation process. The integrity of this separating layer must be maintained throughout the gas separations module to retain a high gas membrane selectivity. This idealized defect-free membrane separating layer could be prepared by increasing the thickness of the layer. In so doing, defects would not be able to protrude through the separating layer. However, this results in a reduction of the gas permeation rate through the membrane, which is not desirable.

In the past, these membrane defects have been sealed to improve gas separations membrane performance. One approach has been to treat the membrane with a swelling agent. The swelling agent may comprise a single component or a multicomponent mixture, such as solvent-nonsolvent mixtures. It is believed that the outer layers of the swollen membrane compact upon drying to yield the observed improvement to the membrane selectivity. Recent examples of such processes include Makino in U.S. Pat. No. 4,486,376; Makino in U.S. Pat. No. 4,512,893; Wang in U.S. Pat. No. 4,512,894; Lee in U.S. Pat. No. 4,527,999; and Thompson in U.S. Pat. No. 4,715,960. Membrane materials may vary greatly in their intrinsic parameters. What may constitute a swelling agent for one material may be a solvent or an inert substance to another material. Examples of this are shown in the before mentioned prior art. Further, certain swelling agents may be effective only for specific polymers or for certain types of defects.

Another approach to healing such defects in gas separation membranes has been to superimpose two layers on top of each other. For example, Robb, in U.S. Pat. No. 3,325,330, teaches that a multicomponent gas membrane prepared from two dense separating layers laminated together is unlikely to have defects because defects in one dense layer are probably not going to align with defects in the other. Browall et al, in U.S. Pat. No. 3,874,986 and U.S. Pat. No. 3,980,456, extend these teachings to include multicomponent gas membranes comprising a laminate between an asymmetric membrane and a dense film. These teachings have been further extended to include multicomponent gas membranes prepared by coating an asymmetric membrane with a solution which upon drying and curing forms a dense polymeric layer (U.S. Pat. No. 4,230,463).

The teachings of the prior art suffer from not taking into account long-term performance of gas membranes. Commercial gas separation membranes preferably retain high performance levels throughout long operational lifetimes of five years or greater. Gas membranes, however, undergo severe environmental stresses such as short membrane contacts with liquids and/or physical shocks during their operational lifetime.

EPO 0,107,636 teaches that the sealed multicomponent gas membrane compositions exemplified in U.S. Pat. No. 4,230,463 suffer from catastrophic membrane performance losses when contacted with low molecular weight fluids, an expected environmental concern during typical gas separation membrane operation. It is believed that these performance declines are due to the adhesion losses between the asymmetric membrane and the sealing coating. The resulting delamination of the sealing coating and the asymmetric membrane reopens the defects in the dense separating layer of the asymmetric membrane. The prior art has not heretofore considered potential performance losses from environmental physical shocks to the gas membrane. Such environmental physical shocks can occur, for example, during the transport of gas membrane modules, installation of gas membrane modules, or as a result of uncontrolled transmembrane-gas-pressure cycling typical of gas membrane operation. Environmental physical shocks would also severely test the adhesion between the sealing treatment and the asymmetric membranes of the multicomponent gas membranes disclosed in the prior art.

U.S. Pat. No. 3,980,456 discloses the use of a preformed organopolysiloxane-polycarbonate copolymer sealing material. The polymeric sealing materials used previously cannot effectively intrude into pores to plug them and are, therefore, only effective by applying a thin coating on top of the membrane material. This causes a substantial loss in membrane productivity. Henis and Tripodi in U.S. Pat. No. 4,230,463, teach that membrane sealing materials are only effective if their molecular size is large enough not to be drawn through the pores of the porous separation membrane during coating and/or separation operations (U.S. Pat. No. 4,230,463, col. 19, line 25-32, line 51-56). Further, they teach that when poly(siloxanes) are used as the membrane sealing material, the polysiloxane molecular weight must be higher than about 1,000 (U.S. Pat. No. 4,230,463; col. 20, line 23-27).

EPO 0,107,636 attempts to correct environmental degradation concerns, but suffers from applying a coating of polysiloxane diols with molecular weights greater than 10,000.

The present invention circumvents the above shortcomings and provides high performance gas separation membranes which are resistant to severe environmental stresses.

The intimate mechanistic details of this procedure are not well understood. They may vary for different material compositions. It is clear that the procedure reduces the effects that membrane defects and imperfections have on the gas-pair selectively.

The synergistic effects of the surfactant and the swelling agent serve to effectively seal a broad variety of membrane types which incorporate a wider distribution of pore and defect sizes than is found in the prior art. The membrane treated by the process of this invention does not suffer from the end-use environmentally-induced delamination of the prior art.

The process of the present invention effects greater selectivity for gas separations membranes used among other things in recovery of hydrogen in refinery and ammonia plants; separation of carbon monoxide from hydrogen in syngas systems; separation of carbon dioxide or hydrogen sulfide from hydrocarbons; enrichment of oxygen and nitrogen from air for increased combustion or inerting streams, respectively.

The present invention finds its greatest utility in effecting greater selectivity for gas membranes used for enrichments of oxygen and nitrogen from air for increased combustion or inerting streams, respectively.

The process of the present invention entails contacting an aromatic polyimide gas separation membrane with a nonsolvent mixture containing a surfactant followed by drying. The gas separation membrane healing technology of the present invention is useful for membranes comprising essentially all aromatic polyimide membrane material composition. Further, this procedure will find utility for many membrane morphologies, such as asymmetric or composite membranes, particularly asymmetric.

The preferred material composition of these asymmetric membranes are soluble aromatic polyimide materials. These polyimides may be prepared by typical procedures as taught in the prior art, such as U.S. Pat. No. 30,351. More preferably, the aromatic polyimide compositions incorporate pendant aliphatic side chains. Examples of such compositions are disclosed in, for example, U.S. Pat. No. 4,705,540 and U.S. Pat. No. 4,717,394.

The preferred aromatic polyimides for use in the present invention consist essentially of repeating units of the formula

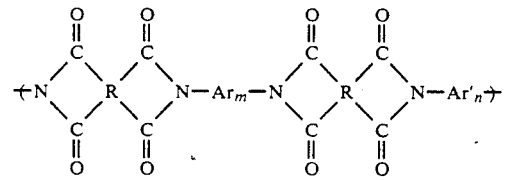

wherein

is selected from the group consisting of

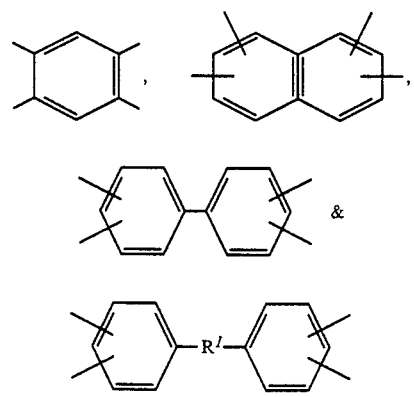

where

—$R^I$— is 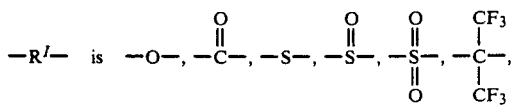

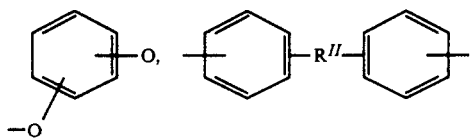

alkylene groups of 1 to 5 carbon atoms, where —$R^{II}$— is

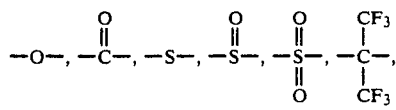

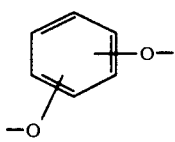

or alkylene groups of 1 to 5 carbon atoms; —Ar— is

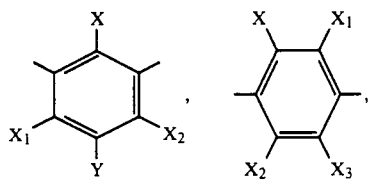

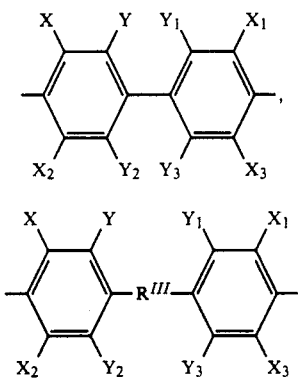

or mixtures thereof where —$R^{III}$— is

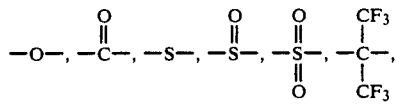

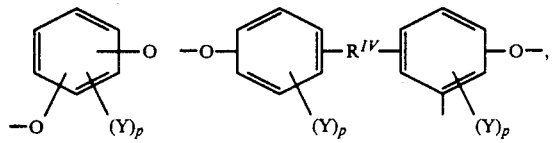

alkylene groups of 1 to 5 carbon atoms where —$R^{IV}$— is 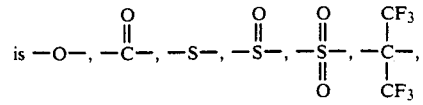

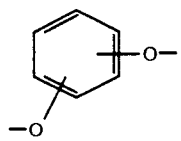

or alkylene groups of 1 to 5 carbon atoms, —X—, —$X_1$—, —$X_2$—, and —$X_3$— independently are alkyl groups of 1 to 5 carbon atoms, alkoxy groups of 1 to 5 carbon atoms, phenyl or phenoxy groups, —Y—, —$Y_1$—, —$Y_2$— and —$Y_3$— independently are —H, —X—, —$X_1$—, —$X_2$—, —$X_3$— or halogen, —Ar'— is

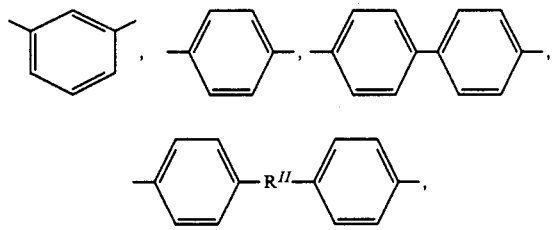

or mixtures thereof where —$R^{II}$— has the above-defined meaning, m is 0 to 100% and preferably 20 to 100% of m plus n, n is 0 to 100% and preferably 20 to 80% of m plus n and m = 100% minus n, and p is 0 to 4.

The gas separations membrane is not limited to any specific type or design. The membrane is preferably in the form of a hollow fiber. The polymeric membrane may be formed as described in the prior art. For example, they may be of the type described in U.S. Pat. No. 4,230,463 or by Cabasso et al in Research and Development of NS-1 and Related Polysulfone Hollow Fibers for Reverse Osmosis Desalination of Seawater (NTIS PB-248666, 7/1975).

In the preferred embodiment of the present invention, a gas separation membrane is contacted with a non-solvent mixture containing a surfactant. The membrane is then dried.

The nonsolvent mixture is defined as being incapable of dissolving greater than 3% by weight of the membrane material at 20° C. Examples of such mixtures may include those which do not interact with the material of compositions of the membrane, swelling agents for the membrane material, mixtures of the above, or mixtures of the above which incorporate a solvent for the membrane material. Preferably the nonsolvent mixture will comprise a swelling agent for the membrane material. Such a swelling agent may be composed of a single component or be a multicomponent mixture incorporating non-interacting substances and/or solvents for the membrane material. Specific nonsolvent mixtures will be dependent on the intrinsic parameters of the membrane material and the membrane morphology. In practical terms, a swelling agent for a certain membrane may be defined as a substance which modifies the membrane's gas permeation properties through contact. Preferably, membrane treatment with said swelling agent as described herein gives at least a 5% improvement in the selectivity of oxygen over nitrogen from the gas pair oxygen/nitrogen (21/79, mole). More preferably, said selectivity enhancement is 10% or greater.

Surfactants effective in the herein described procedure may include anionic, cationic, or neutral (non-ionic) types. They may be aliphatic, aromatic, or fluorinated. Said surfactants are to be incorporated in an effective amount. This effective amount will vary broadly based on the chemical nature of the surfactant, on the nature of the nonsolvent mixture, on the chemical nature of the membrane material, and on the morphology of the membrane to be treated. Preferably, membranes treated with an effective amount of surfactant, as described herein, will demonstrate at least a 5% enhancement in the selectivity of oxygen over nitrogen from the gas pair oxygen/nitrogen (21/79, mole) when compared to an identical membrane treated with the same nonsolvent mixture which does not incorporate said surfactant.

EXAMPLES

Referential Example

This referential example describes the material and processes by which asymmetric hollow fiber aromatic polyimide gas separation membranes were produced. The hollow fiber membranes are spun from a hollow fiber spinnerette into a water coagulant as has been taught in the prior art.

A polymer solution was prepared with approximately 21% (weight) solids content of the aromatic polyimide prepared by the polycondensation of 2,4,6-trimethyl-1,3-phenylene diamine with a 1:1 (molar) mixture of 4,4'-[2,2,2-trifluoro-1-(trifluoromethyl)ethylidene] bis(1,2-benzenedicarboxylic acid anhydride) and 3,3', 4,4'-biphenyltetracarboxylic acid dianhydride, 20% (weight, based on polymer) lithium nitrate, 20% (weight, based on polymer) tetramethylene sulfone, 3% (weight, based on polymer) 4,4'-[2,2,2-trifluoro-1-(trifluoromethyl)-ethylidene bis(1,2-benzenedicarboxylic acid anhydride] in a 1:1 (weight) mixture of N,N-dimethylacetamide and dimethylsulfoxide. Similar polymers are described in U.S. Pat. No. 4,705,540 and U.S. Pat. No. 4,717,394. The above polymer solution was extruded through a hollow fiber spinnerette with fiber channel dimensions of outer diameter (OD) equal to 22 mils ($5.6 \times 10^{-4}$ M) and inner diameter (ID) equal to 10 mils ($2.54 \times 10^{-4}$ M) at the rate of 213 cc per hour at 115° C. A solution of 1% (weight) lithium nitrate in a 47.5:47.5:5.0% (weight) solution of N,N-dimethylacetamide:dimethylsulfoxide:water was injected into the fiber bore at a rate of 85.7 cc per hour. The spun fiber passed through an air gap length of 1 cm at 20° C. into a water coagulant bath maintained at 20° C. The fiber was wound up on a drum at the rate of 75 meters per minute.

The water-wet fiber was dehydrated as taught in U.S. Pat. No. 4,080,743; U.S. Pat. No. 4,080,744; U.S. Pat. No. 4,120,098; and EPO 219,878. This specifically involved the sequential replacement of water with methanol, the replacement of methanol with hexane, and drying.

The fibers were cut into lengths approximately 20 inches (0.51 m) long and the open ends of the fibers were potted in an epoxy resin within a ¼ inch (0.00635 m) diameter stainless steel tube to provide loops approximately 9 inches (0.23 m) long. From 10 to 24 fibers were so potted for the individual tests.

EXAMPLES 1-7

Asymmetric polyimide hollow fiber membranes, prepared as described in Referential Example, were tested for mixed gas oxygen/nitrogen (21/79 mole ratio) permeabilities at 100 psig (689 kPa), 24° C.±2° C. Results are reported in Table 1.

The outer surfaces of the polyimide membranes were contacted with an aqueous solution of a nonionic fluorosurfactant which is a 50% solution of a fluoroaliphatic polymeric ester in ethyl acetate (surfactant A) at the concentrations (weight, based on active agent) reported in Table 1 at room temperature for 0.25 hours. The solutions were drained and the membranes dried in a vacuum oven at 20 inches (0.51 ml mercury) and 60° C. overnight.

The membranes were tested for mixed gas oxygen/nitrogen (21/79 mole ratio) permeabilities at 100 psig (689 kPa), 24° C. ±2° C. Results are reported in Table 1.

TABLE 1

| Example | Preliminary | | Treatment Concentration (wt %) | Treated | |
|---|---|---|---|---|---|
| | $PO_2$ (GPU) | $PO_2/PN_2$ | | $PO_2$ (GPU) | $PO_2/PN_2$ |
| 1 | 140 | 2.9 | 0.05 | 35 | 4.4 |
| 2 | 145 | 2.9 | 0.025 | 40 | 4.5 |
| 3 | 140 | 3.1 | 0.005 | 40 | 4.5 |
| 4 | 155 | 2.7 | 0.005 | 30 | 4.4 |
| 5 | 155 | 3.0 | 0.0025 | 45 | 4.3 |
| 6 | 125 | 3.4 | 0.0005 | 60 | 4.2 |
| 7 | 120 | 3.1 | 0.00025 | 65 | 4.1 |

$$GPU = 10^{-6} \times \frac{cm^3 (STP)}{cm^2 \times sec \times (cmHg)}$$

CONTROL EXAMPLES 1-2

Asymmetric polyimide hollow fiber membranes, prepared as described in Referential Example, were tested for mixed gas oxygen/nitrogen (21/79 mole ratio) permeabilities at 100 psig (989 kPa), 24° C.±2° C. Results are reported in Table 2.

The outer surfaces of the polyimide membranes were contacted with deionized water at room temperature for 0.25 hours. The water was drained and the membranes dried in a vacuum oven at 20 inches (0.51 m) mercury and 60° C. ±10° C. overnight. The membranes were tested for mixed gas oxygen/nitrogen (21/79 mole ratio) permeabilities at 100 psig (689 kPa), 24° C. ±2° C. Results are reported in Table 2.

TABLE 2

| Control Example | Preliminary | | Treated | |
|---|---|---|---|---|
| | $PO_2$ (GPU) | $PO_2/PN_2$ | $PO_2$ (GPU) | $PO_2/PN_2$ |
| 1 | 120 | 3.2 | 95 | 3.6 |
| 2 | 115 | 3.1 | 55 | 3.9 |

EXAMPLES 8-25

Asymmetric polyimide hollow fiber membranes, prepared as described in Referential Example 1, were tested for mixed gas oxygen/nitrogen (21/79 mole ratio) permeabilities at 100 psig (689 kPa), 24° C.±2° C. Results are reported in Table 3.

The outer surfaces of the polyimide membranes were contacted with aqueous solutions of the aliphatic surfactants listed in Table 3 at room temperature for 0.25 hour. The solutions were drained and the membranes dried in a vacuum oven at 20 inches (0.51 m) mercury, and 60° C ±10° C. overnight. The membranes were tested for mixed gas oxygen/nitrogen (21/79 mole ratio) permeabilities at 100 psig (689 kPa), 24° C. ±2° C. Results are reported in Table 3.

TABLE 3

| Ex-ample | Preliminary | | Treatment Solution (wt %) | Treated | |
|---|---|---|---|---|---|
| | $PO_2$ (GPU) | $PO_2/PN_2$ | | $PO_2$ (GPU) | $PO_2/PN_2$ |
| 8 | 130 | 3.1 | 0.1 SURFACTANT B | 60 | 4.4 |
| 9 | 115 | 3.4 | 0.1% SURFACTANT C | 50 | 4.2 |
| 10 | 130 | 3.2 | 0.1% SURFACTANT D | 20 | 4.9 |
| 11 | 140 | 3.0 | 0.01% SURFACTANT D | 30 | 4.9 |
| 12 | 130 | 3.0 | 0.005% SURFACTANT D | 35 | 4.6 |
| 13 | 115 | 3.2 | 0.055% SURFACTANT E | 25 | 4.7 |
| 14 | 150 | 2.9 | 0.0055% SURFACTANT E | 35 | 4.7 |
| 15 | 120 | 3.2 | 0.00175% SURFACTANT E | 35 | 4.6 |
| 16 | 140 | 3.1 | 0.00055% SURFACTANT E | 60 | 4.0 |
| 17 | 145 | 3.0 | 0.055% SURFACTANT F | 35 | 4.2 |
| 18 | 170 | 2.7 | 0.1% SURFACTANT G | 25 | 4.0 |
| 19 | 165 | 2.8 | 0.01% SURFACTANT G | 40 | 4.2 |
| 20 | 155 | 2.9 | 0.1% SURFACTANT H | 10 | 4.8 |
| 21 | 170 | 2.8 | 0.005% SURFACTANT H | 55 | 4.0 |
| 22 | 160 | 2.8 | 0.005% SURFACTANT H | 55 | 4.0 |
| 23 | 150 | 2.8 | 0.0475% SURFACTANT I | 20 | 5.0 |
| 24 | 150 | 2.9 | 0.00475% SURFACTANT I | 35 | 4.8 |
| 25 | 170 | 3.0 | 0.00238% SURFACTANT I | 65 | 4.2 |

In Table 3, surfactant B is an anionic surfactant which is 90% of sodium alkyl naphthalene sulfonate. Surfactant C is 90%–96% active ingredient anionic surfactant sodium lauryl sulfate. Surfactant D is 100% active ingredient nonionic surfactant which is ethoxylated phosphate. Surfactant E is a 60% active ingredient nonionic surfactant which is an amine ethoxylate. Surfactant F is a 60% active ingredient nonionic surfactant which is alcohol ethoxylate. Surfactant G is 100% active ingredient nonionic surfactant which is alcohol ethoxylate. Surfactant H is 95% active ingredient nonionic surfactant which is alcohol ethoxylate. Surfactant I is a 50% active ingredient nonionic surfactant which is alcohol ethoxylate.

EXAMPLES 26–34

Asymmetric polyimide hollow fiber membranes, prepared as described in Referential Example, were tested for mixed gas oxygen/nitrogen (21/79 mole ratio) permeabilities at 100 psig (689 kPa) 24° C. ±2° C. Results are reported in Table 4.

The outer surfaces of the polyimide membranes were contacted with aqueous solutions of the fluorosurfactants listed in Table 4 at the concentrations (weight, based on active agent) listed in Table 4 at room temperature for 0.25 hours. The solutions were drained and the membranes dried in a vacuum oven at 20 inches (0.51m) mercury and 60° C. ±10° C. overnight. The membranes were tested for mixed gas oxygen/nitrogen (21/79 mole ratio) permeabilities at 100 psig (689 kPa) 24° C. ±2° C. Results are reported in Table 4.

TABLE 4

| Ex-ample | Preliminary | | Treatment Solution (wt %) | Treated | |
|---|---|---|---|---|---|
| | $PO_2$ (GPU) | $PO_2/PN_2$ | | $PO_2$ (GPU) | $PO_2/PN_2$ |
| 26 | 145 | 2.9 | 0.04% SURFACTANT J | 35 | 4.6 |
| 27 | 150 | 2.9 | 0.004% SURFACTANT J | 50 | 4.2 |
| 28 | 130 | 2.9 | 0.047% SURFACTANT K | 50 | 4.1 |
| 29 | 140 | 3.1 | 0.04% SURFACTANT L | 30 | 4.6 |
| 30 | 135 | 3.0 | 0.004% SURFACTANT L | 50 | 4.2 |
| 31 | 165 | 3.0 | 0.05% SURFACTANT M | 35 | 4.5 |
| 32 | 140 | 3.0 | 0.005% SURFACTANT M | 50 | 4.1 |
| 33 | 150 | 2.9 | 0.1% SURFACTANT N | 30 | 4.4 |

TABLE 4-continued

| Ex-ample | Preliminary | | Treatment Solution (wt %) | Treated | |
|---|---|---|---|---|---|
| | $PO_2$ (GPU) | $PO_2/PN_2$ | | $PO_2$ (GPU) | $PO_2/PN_2$ |
| 34 | 125 | 2.9 | 0.01% SURFACTANT N | 45 | 4.1 |

In Table 4 surfactant J is an anionic fluorosurfactant supplied as a 40 wt % solution in a 45/15 water/isopropanol mixture, and is a mixture of $(R_fCH_2CH_2O)P(O)(ONH_4)$ and a nonfluorinated surfactant. Surfactant K is an amphoteric fluorosurfactant present as a 47 wt % solution in acetic acid, which surfactant has the formula $(R_fCH_2CH_2(OCOCH_3)CH_2N^+(CH_3)_2CH_2CO_2^-$. Surfactant L is a nonionic fluorosurfactant supplied as a 40 wt % solution in 30/30 water/isopropyl alcohol which surfactant has the formula $R_fCH_2CH_2O(CH_2CH_2O)_xH$. Surfactant M is a nonionic fluorosurfactant supplied as a 50 wt % solution in a 25/25 water/ethylene glycol mixture which has the formula $R_fCH_2CH_2O(CH_2CH_2O)_yH$. Surfactant N is a nonionic fluorosurfactant having the formula $(R_fCH_2CH_2O)P(O)(ONH_4)_2$. In each of the above formulae $R_f$ is $F(CF_2CF_2)_{3-8}$.

EXAMPLES 35–43

Asymmetric polyimide hollow fiber membranes, prepared as described in Referential Example 1, were tested for mixed gas oxygen/nitrogen (21/79 mole ratio) permeabilities at 100 psig (689 kPa), 24° C. ±2° C. Results are reported in Table 5.

The outer surfaces of the polyimide membranes were contacted with aqueous solutions of the fluorosurfactants listed in Table 5 at the concentrations (weight, based on active agent) listed in Table 5 at room temperature for 0.25 hours. The solutions were drained and the membranes dried in a vacuum oven at 20 inches (0.51 m) mercury and 60° C. ±10° C. overnight. The membranes were tested for mixed gas oxygen/nitrogen (21/79 mole ratio) permeabilities at 100 psig (689 kPa), 24° C. ±2° C. Results are reported in Table 5.

TABLE 5

| Ex-ample | Preliminary | | Treatment Solution (wt %) | Treated | |
|---|---|---|---|---|---|
| | $PO_2$ (GPU) | $PO_2/PN_2$ | | $PO_2$ (GPU) | $PO_2/PN_2$ |
| 35 | 135 | 2.9 | 0.05% SURFACTANT O | 35 | 4.4 |
| 36 | 130 | 2.9 | 0.005% SURFACTANT O | 50 | 4.1 |
| 37 | 145 | 2.8 | 0.05% SURFACTANT P | 35 | 4.0 |
| 38 | 145 | 2.8 | 0.081% SURFACTANT P | 40 | 4.5 |
| 39 | 165 | 2.9 | 0.081% SURFACTANT Q | 45 | 4.3 |
| 40 | 160 | 2.9 | 0.05% SURFACTANT Q | 30 | 4.7 |
| 41 | 180 | 2.9 | 0.025% SURFACTANT R | 25 | 4.9 |
| 42 | 165 | 2.8 | 0.1% SURFACTANT R | 20 | 5.2 |
| 43 | 150 | 3.0 | 0.001% SURFACTANT S | 30 | 4.8 |

In Table 5, Surfactant O is a cationic fluorosurfactant comprising 50% active solids, 33% isopropyl alcohol and 17% water. Surfactant P is an anionic fluorosurfactant which is a 25% active ingredient solution of amine perfluoroalkyl sulfonates in water. Surfactant Q is a nonionic fluorosurfactant which is 95% of the active ingredient fluorinated alkyl polyoxyethylene ethanols. Surfactant R is an amphoteric fluorosurfactant comprising 25% sodium salt of fluoroalkyl sulfonate in 25% diethylene glycol monobutyl ether and 50% water. Surfactant S is 100% of a nonionic fluorosurfactant which is fluoroaliphatic polymeric esters.

CONTROL EXAMPLES 3–5

Asymmetric polyimide hollow fiber membranes, prepared as described in Referential Example, were tested for mixed gas oxygen/nitrogen (21/79 mole ratio) permeabilities at 100 psig (689 kPa), 24° C. ±2° C. Results are reported in Table 6.

The outer surfaces of the polyimide membranes were contacted with FREON® 113 (1,1,2-trichloro-1,2,2-trifluoroethane) at room temperature for 0.24 hours. The FREON® 113 was drained and the membranes dried in a vacuum oven at 20 inches (0.51 m) mercury and 60° C. ±10° C. overnight. The membranes were tested for mixed gas oxygen/nitrogen (21/79 mole ratio) permeabilities at 100 psig (689 KPa), 24° C. ±2° C. Results are reported in Table 6.

TABLE 6

| Control Example | Preliminary PO$_2$ (GPU) | Preliminary PO$_2$/PN$_2$ | Treated PO$_2$ (GPU) | Treated PO$_2$/PN$_2$ |
|---|---|---|---|---|
| 3 | 165 | 2.9 | 30 | 4.4 |
| 4 | 150 | 3.0 | 20 | 4.7 |
| 5 | 150 | 3.2 | 25 | 4.8 |

EXAMPLES 44–48

Asymmetric polyimide hollow fiber membranes, prepared as described in Referential Example, were tested for mixed gas oxygen/nitrogen (21/79 mole ratio) permeabilities at 100 psig (689 kPa), 24° C. ±2° C. Results are reported in Table 7.

The outer surfaces of the polyimide membranes were contacted with the mixtures of surfactants listed in Table 7 (descriptions of surfactants in earlier examples) FREON® 113 at the concentrations (weight, based on active agent) listed in Table 7 at room temperature for 0.25 hours. The mixtures were drained and the membranes dried in a vacuum oven at 20 inches (0.51 m) mercury) and 60° C. ±10° C. overnight. The membranes were tested for mixed gas oxygen/nitrogen (21/79, mole ratio) permeabilities at 100 psig (689 kPa), 24° C. ±2° C. Results are reported in Table 7.

TABLE 7

| Example | Preliminary Treatment PO$_2$ (GPU) | Preliminary Treatment PO$_2$/PN$_2$ | Treated Mixture (wt %) | PO$_2$ (GPU) | PO$_2$/PN$_2$ |
|---|---|---|---|---|---|
| 44 | 135 | 2.9 | 0.1% SURFACTANT D | 10 | 5.1 |
| 45 | 150 | 2.9 | 0.04% SURFACTANT J | 15 | 4.9 |
| 46 | 135 | 2.9 | 0.1% SURFACTANT N | 15 | 5.0 |
| 47 | 135 | 2.9 | 0.081% SURFACTANT Q | 10 | 5.0 |
| 48 | 150 | 2.9 | 0.1% SURFACTANT S | 20 | 4.9 |

What is claimed is:

1. A process for improving the permselectivity of a gas separation membrane comprising aromatic polyimides with respect to at least one gas of a gaseous mixture comprising contacting said membrane with a solution of an effective amount of a surfactant in a solvent, the solvent being capable of swelling the membrane but incapable of dissolving more than 3 weight percent of the membrane under conditions of contacting the membrane, the amount of surfactant being sufficient to provide at least a 5% improvement in the selectivity of the membrane with respect to oxygen over nitrogen from a 21/79 mole ratio oxygen/nitrogen mixture over the selectivity achieved with the solvent alone.

2. The process of claim 1 wherein the aromatic polyimide consists essentially of repeating units of the formula

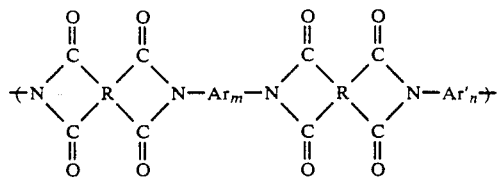

wherein

is selected from the group consisting of

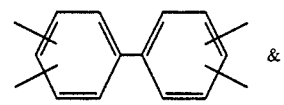

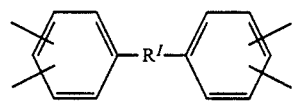

where

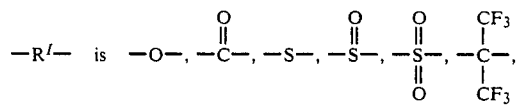

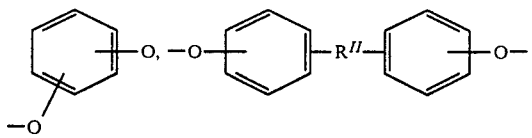

or alkylene groups of 1 to 5 carbon atoms where —R$^{II}$—

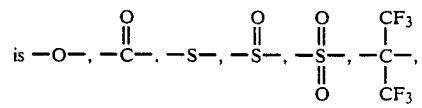

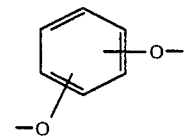

or alkylene groups of 1 to 5 carbon atoms; —Ar— is

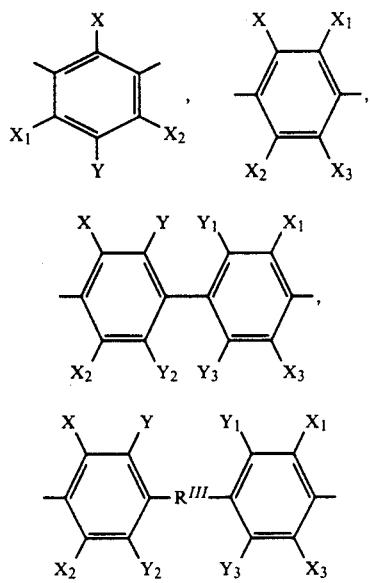

or mixtures thereof where —R$^{III}$— is —O—,

—S—,

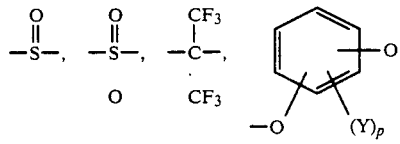

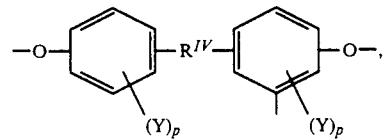

or alkylene groups of 1 to 5 carbon atoms, alkoxy groups of 1 to 5 carbon atoms, phenyl or phenoxy groups, where —R$^{IV}$— is

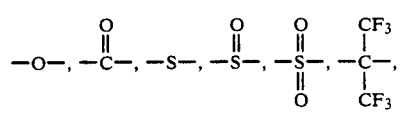

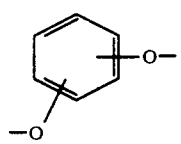

or alkylene groups of 1 to 5 carbon atoms, —X—, —X$_1$—, —X$_2$—, and —X$_3$— independently are alkyl groups of 1 to 5 carbon atoms, alkoxy groups of 1 to 5 carbon atoms, phenyl or phenoxy groups, —Y, —Y$_1$, —Y$_2$ and —Y$_3$ independently are —H, —X, —X$_1$, —X$_2$, —X$_3$ or halogen, —Ar'— is

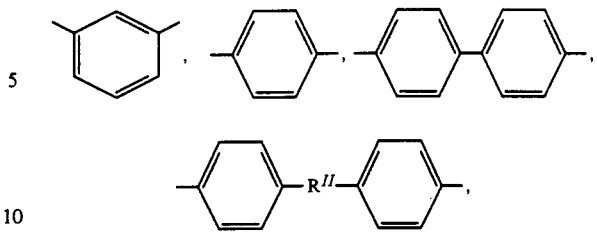

or mixtures thereof where —R$^{II}$— has the above-defined meaning, m is 0 to 100% of m plus n, n is 0 to 100% of m plus n, and n = 100% minus m, and P is 0 to 4.

3. The process of claim 2 wherein —m— is 20–100% of m plus n.

4. The process of claim 3 wherein the surfactant is a nonionic surfactant.

5. The process of claim 4 wherein the surfactant is a fluorinated surfactant.

6. The process of claim 4 wherein the surfactant is a hydrocarbate.

7. The process of claim 3 wherein the surfactant is an anionic surfactant.

8. The process of claim 7 wherein the surfactant is a fluorinated surfactant.

9. The process of claim 7 wherein the hydrophobic portion of the surfactant is a hydrocarbon.

10. The process of claim 3 wherein —Ar— is

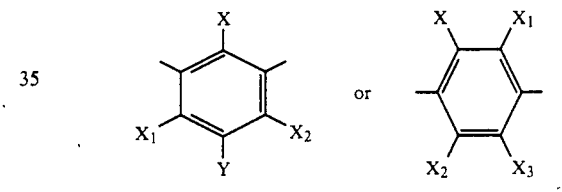

11. The process of claim 10 wherein

is

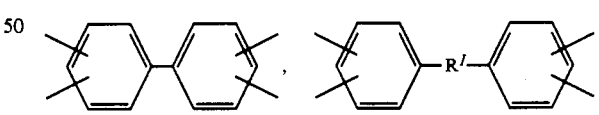

12. The process of claim 11 wherein —R$^I$— is

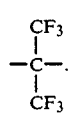

13. A gas separation membrane comprising an aromatic polyimide posttreated with a solution of an effective amount of a surfactant in a solvent, the solvent being capable of swelling the membrane but incapable of dissolving more than 3 weight percent of the membrane under conditions of contacting the membrane, the amount of surfactant being sufficient to provide at least a 5% improvement in the selectivity of the membrane with respect to oxygen over nitrogen from a 21/79 mole ratio oxygen/nitrogen mixture over the selectivity achieved with the solvent alone.

14. The gas separation membrane of claim 13 wherein the aromatic polyimide consists essentially of repeating units of the formula

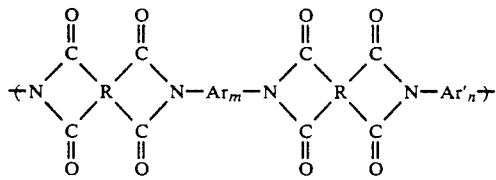

wherein

is selected from the group consisting of

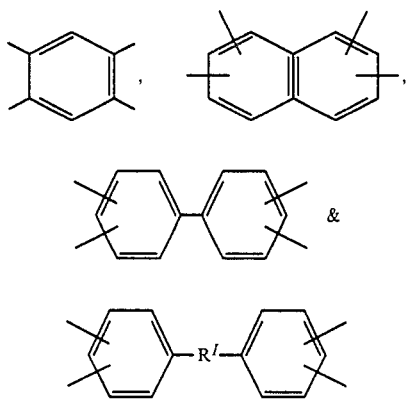

where

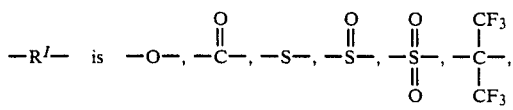

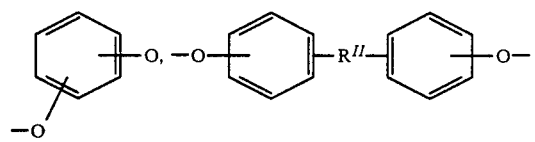

or alkylene groups of 1 to 5 carbon atoms where —$R^{III}$—,

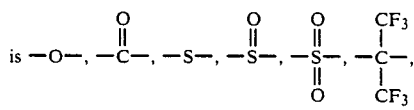

or alkylene groups of 1 to 5 carbon atoms; —Ar— is

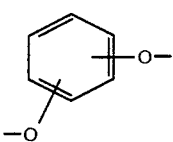

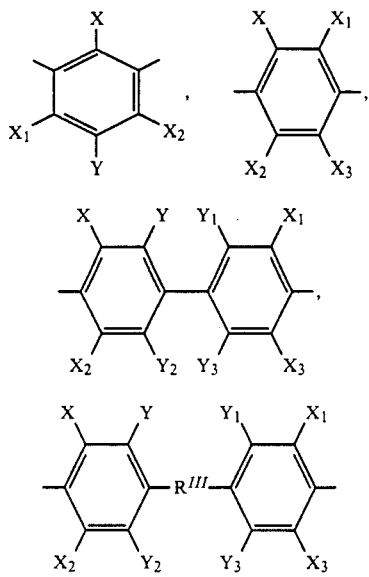

or mixtures thereof where —$R^{III}$— is —O—,

—S—,

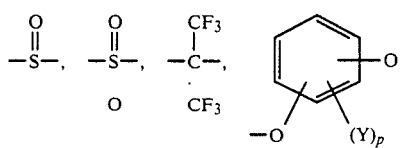

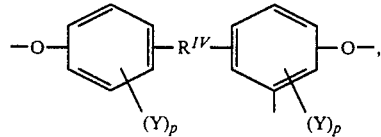

alkylene groups of 1 to 5 carbon atoms, alkoxy groups of 1 to 5 carbon atoms, phenyl or phenoxy groups, where —$R^{IV}$— is

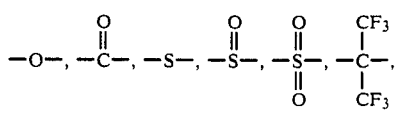

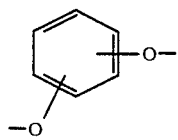

or alkylene groups of 1 to 5 carbon atoms, —X—, —Y$_1$—, —X$_2$—, and —X$_3$— independently are alkyl groups of 1 to 5 carbon atoms, alkoxy groups of 1 to 5 carbon atoms, phenyl or phenoxy groups, —Y, —Y$_1$, —Y$_2$ and —Y$_3$ independently are —H, —X, —X$_1$, —X$_2$, —X$_3$ or halogen, —Ar'— is

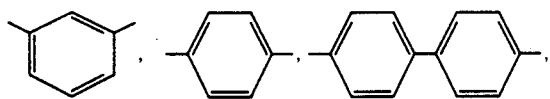

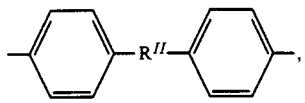

or mixtures thereof where —R$^{II}$— has the above-defined meaning, m is 0 to 100% of m plus n, n is 0 to 100% of m plus n, and n = 100% minus m, and P is 0 to 4.

15. A process of separating at least one component from a gaseous mixture comprising bringing said gaseous mixture into contact with a feed side of the gas separation membrane of claim 13 in a manner to cause the component to permeate said membrane to a permeate side, the resulting gas mixture on the permeate side being enriched in the component over that of the mixture on the feed side.

* * * * *

UNITED STATES PATENT AND TRADEMARK OFFICE
CERTIFICATE OF CORRECTION

PATENT NO. :   5,034,024                                   Page 1 of 2
DATED      :   July 23, 1991
INVENTOR(S):   Richard Allen Hayes It is certified that error appears in the above-identified patent and that said Letters Patent is hereby corrected as shown below:

In Claim 2, at column 13, line 35:

Please delete " $-\overset{\overset{O}{\|}}{S}-$ , $-\overset{\overset{CF_3}{|}}{C}-$ " and substitute -- $-\overset{\overset{O}{\|}}{\underset{\underset{O}{\|}}{S}}-$ , $-\overset{\overset{CF_3}{|}}{\underset{\underset{CF_3}{|}}{C}}-$ --.

In Claim 14, at column 15, line 61:

Please delete " $-R^{III}-$ " and substitute -- $-R^{II}-$ --.

In Claim 14, at column 16, line 43:

Please delete " $-\overset{\overset{O}{\|}}{\underset{\underset{O}{}}{S}}-$ , $-\overset{\overset{CF_3}{|}}{\underset{\underset{CF_3}{}}{C}}-$ " and

UNITED STATES PATENT AND TRADEMARK OFFICE
CERTIFICATE OF CORRECTION

PATENT NO. : 5,034,024
DATED : July 23, 1991
INVENTOR(S) : Richard Allen Hayes

It is certified that error appears in the above-identified patent and that said Letters Patent is hereby corrected as shown below:

substitute -- 
$$-\overset{\overset{O}{\|}}{\underset{\underset{O}{\|}}{S}}-\ ,\ -\overset{\overset{CF_3}{|}}{\underset{\underset{CF_3}{|}}{C}}- \quad --.$$

In Claim 14, at column 17, line 3:
   Please delete "$-Y_1$" and substitute --   $-X_1-$   --.

Signed and Sealed this

Twenty-ninth Day of December, 1992

Attest:

DOUGLAS B. COMER

*Attesting Officer*     Acting Commissioner of Patents and Trademarks